Jan. 19, 1943.  R. D. HULSLANDER  2,308,950
TIRE BALANCING APPARATUS
Filed March 15, 1939   6 Sheets-Sheet 4

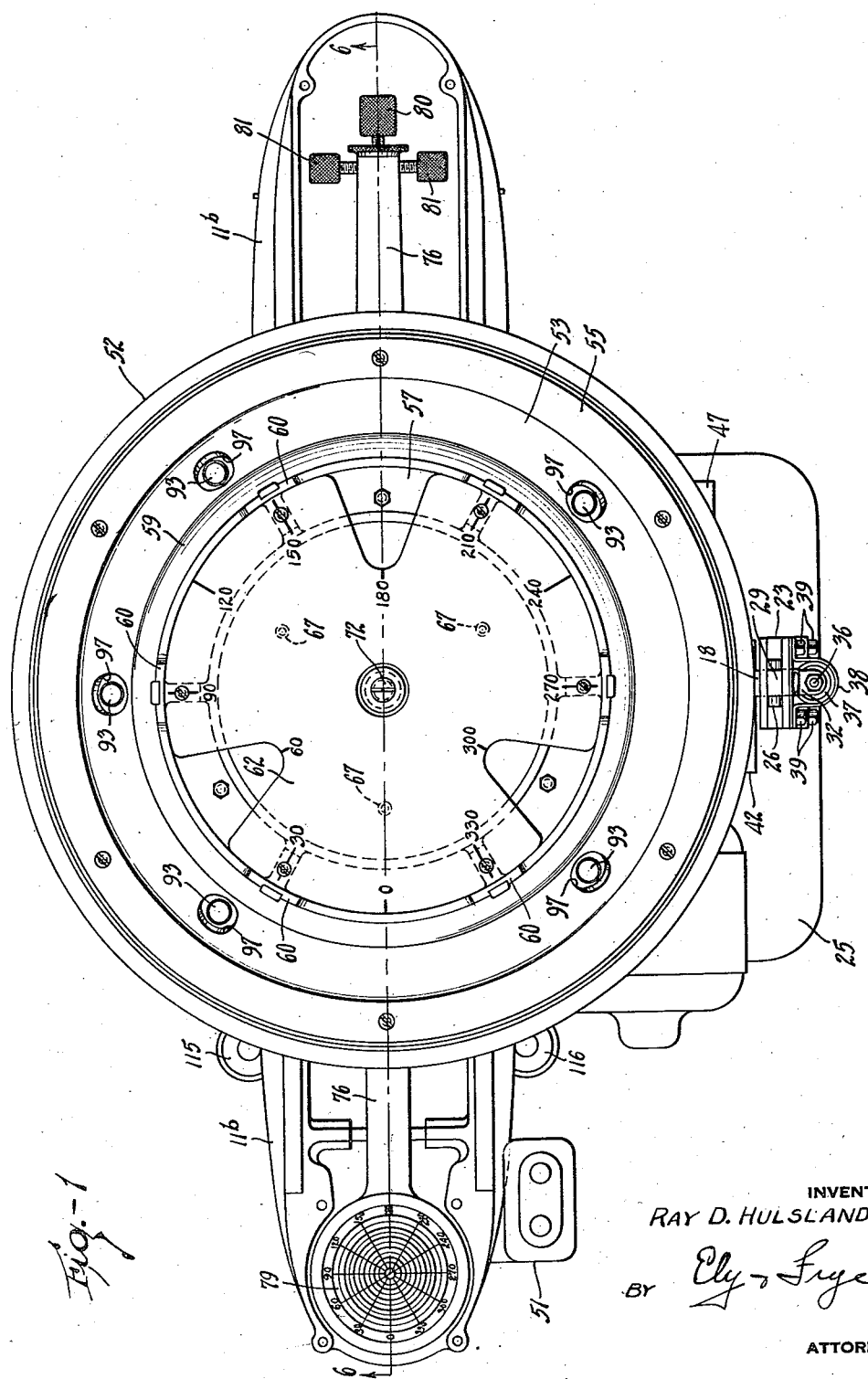

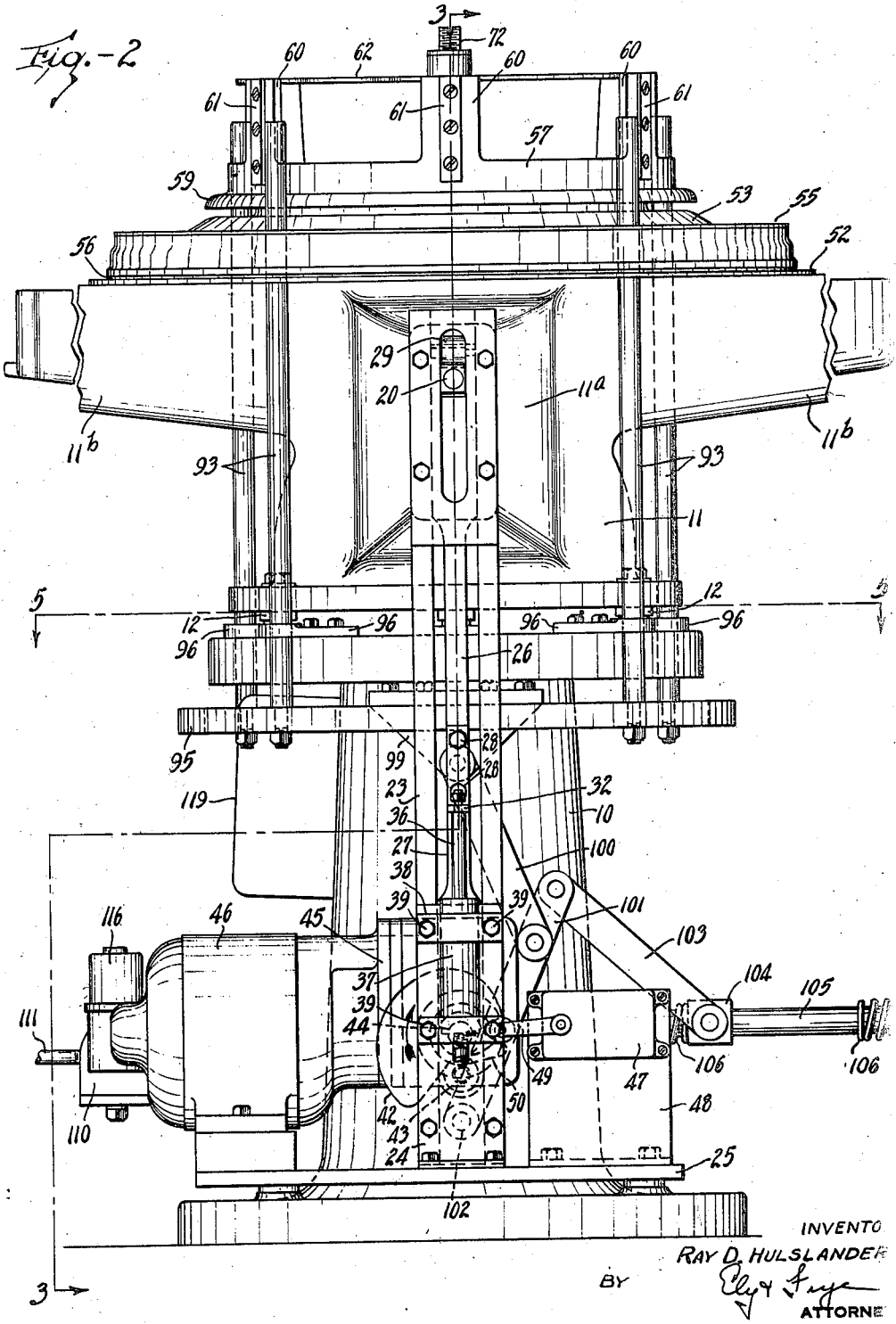

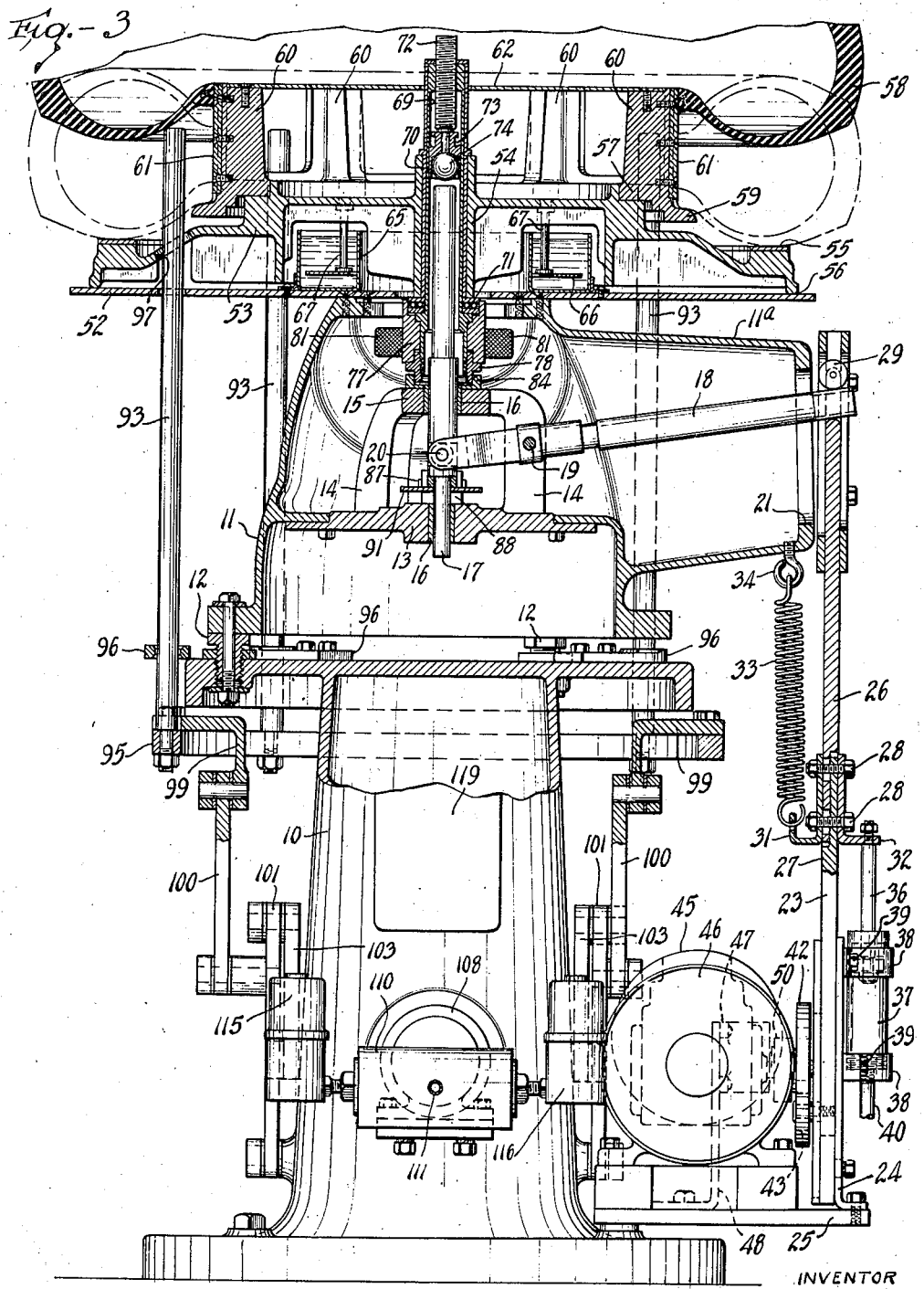

INVENTOR
RAY D. HULSLANDER
BY Ely & Frye, ATTORNEYS

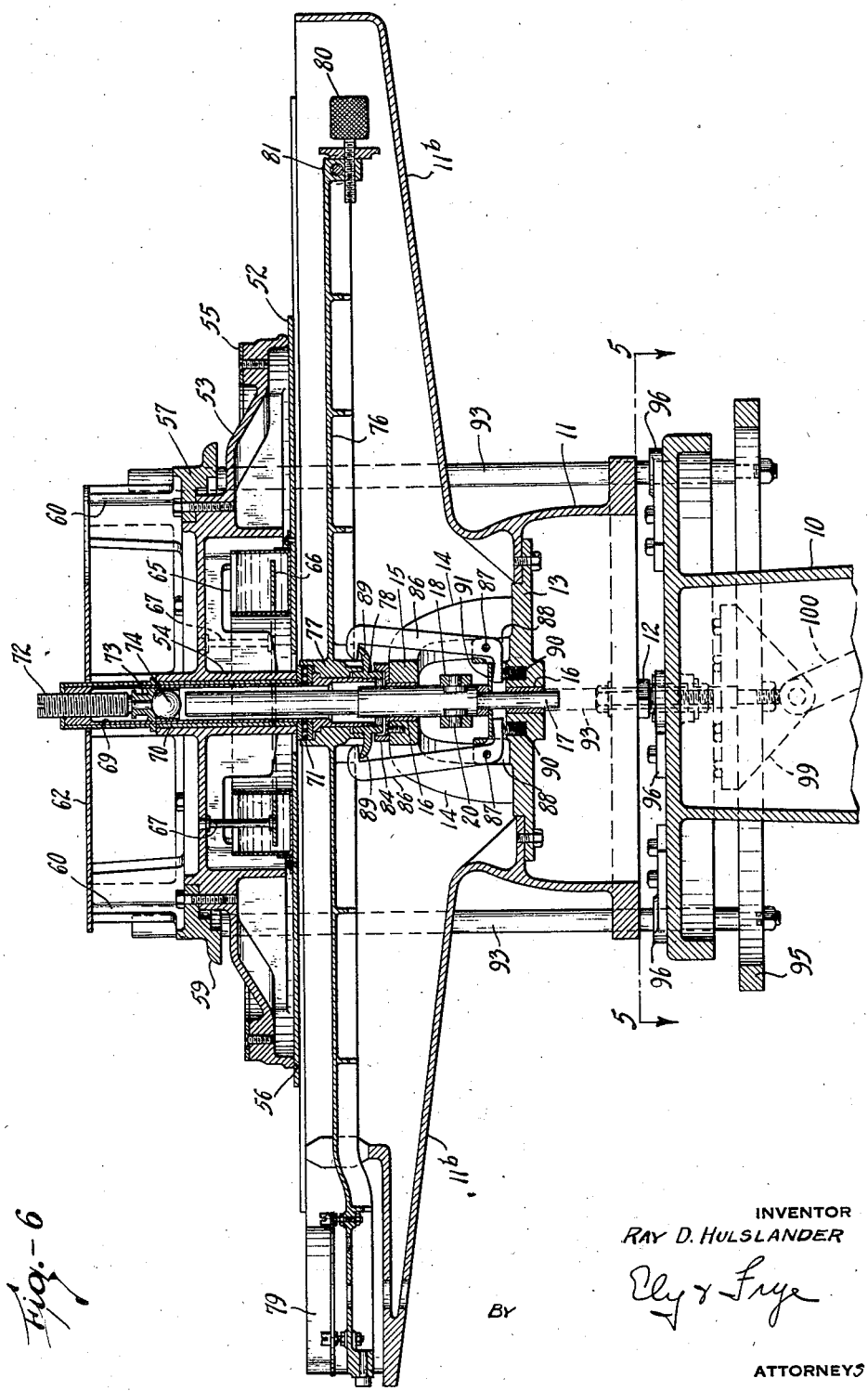

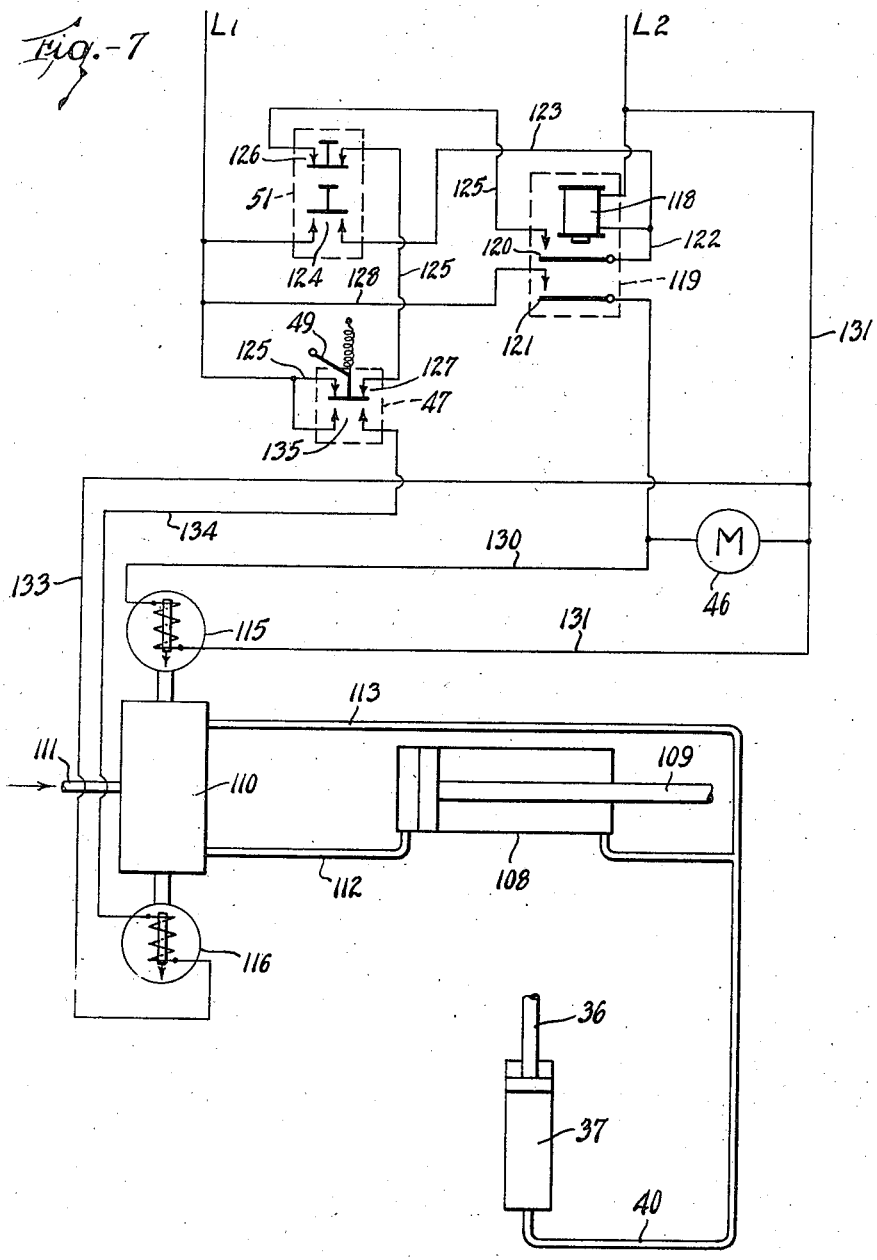

Patented Jan. 19, 1943

2,308,950

UNITED STATES PATENT OFFICE 2,308,950

TIRE BALANCING APPARATUS

Ray D. Hulslander, Akron, Ohio, assignor to The Firestone Tire & Rubber Company, Akron, Ohio, a corporation of Ohio Application March 15, 1939, Serial No. 261,971

7 Claims. (Cl. 73—53)

This invention relates to tire balancing apparatus, and more especially it relates to improvements in and upon a tire balancing apparatus of known construction now in commercial use.

Tire balancing apparatus of the character mentioned includes a universally movable balancing head upon which a tire to be balanced is receivable, said head having a depressed, inoperative position and an elevated, operative position. In the commercial form of the apparatus, the elevating of the balancing head is effected manually by means of a hand-operated lever. Such operation of the apparatus is non-uniform, and subject to jolts and jars such as to cause oscillation of the balancing head, and in the absence of damping means, such oscillation prolongs the time required for the head to come to rest so that an accurate reading may be obtained.

The chief object of this invention is to speed up the operation of balancing apparatus of the character mentioned. More specifically, the invention aims to provide mechanical means for raising and lowering the balancing head; to effect the raising of the balancing head with an even movement that obviates jars and jolts; to provide means enabling the balancing head smoothly to oscillate as it is lifted from inoperative position; and to provide means for damping any and all oscillations of the balancing head. Other objects will be manifest as the specification proceeds.

Of the accompanying drawings:

Figure 1 is a plan view of a tire balancing apparatus embodying the invention;

Figure 2 is a front elevation thereof;

Figure 3 is a vertical section on the line 3—3 of Figure 2, the apparatus being in its inoperative position, and a pneumatic tire casing thereon;

Figure 6 is a section on the line 6—6 of Figure 1; and

Figure 7 is an integrated wiring diagram and piping diagram of the apparatus.

Figure 5:
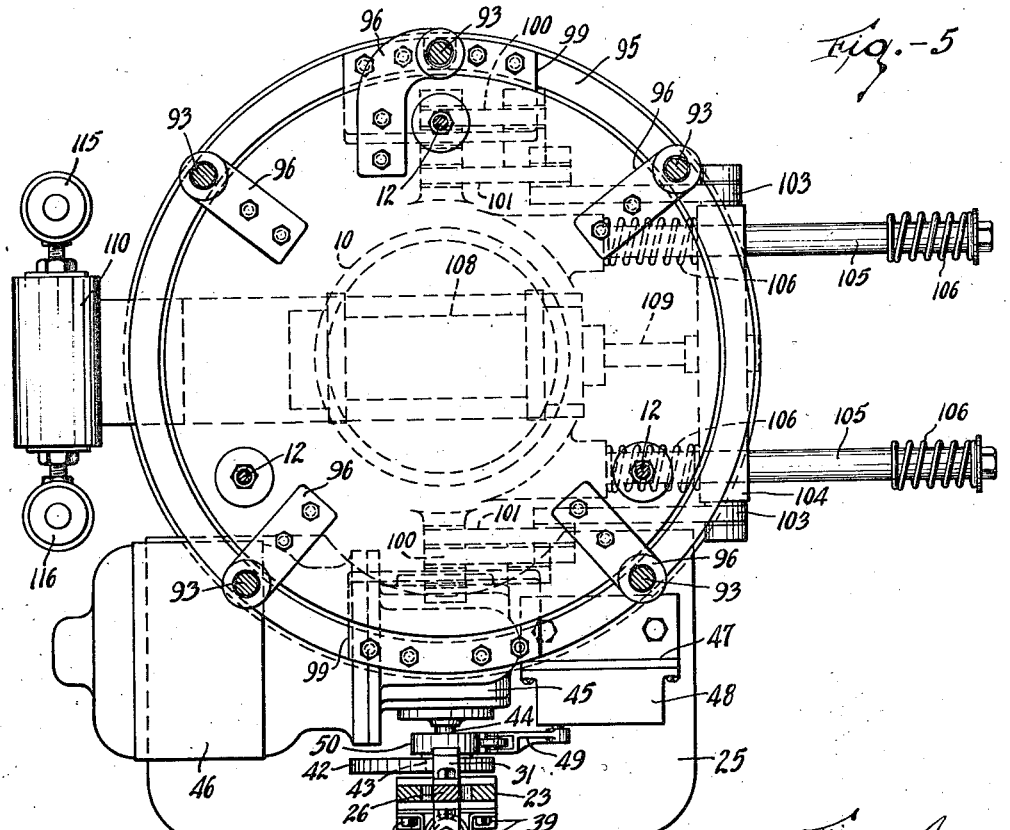
Figure 5 is a section on the line 5—5 of Figure 2 and Figure 6.

Referring to the drawings, 10 denotes a pedestal base or support, and 11 is a cast metal frame or housing structure, the latter being secured to the top of said base 10 by means of adjustable connections 12, 12 that enable the frame or housing to be so positioned that the axis thereof is exactly vertical. The housing 11 is formed with a hollow, forwardly extending portion 11a, and at its top is formed with two aligned, hollow, laterally extending arm-like portions 11b, 11b that are open at the top. Mounted interiorly of the housing 11 is a bearing bracket 13 that is formed with three upwardly extending spider arms 14, 14, the latter supporting a bearing structure 15. The latter and the bracket 13 carry vertically aligned bearings 16, 16 in which a spindle 17 is slidably mounted for vertical reciprocating movement. For raising and lowering the spindle 17 a lever 18 is provided, which lever is fulcrumed on one of the spider arms 14 at 19, and has a forked end portion that straddles the spindle and is pivotally connected thereto at 20. The lever 18 extends toward the front of the apparatus, its forward end portion projecting from a slot 21 in the front face of housing formation 11a. Positioned at the front of the apparatus is a vertical guide structure, generally designated 23, that is supported by an anchor plate 24 secured to the bottom thereof, said anchor plate resting upon a base plate 25 that rests upon the base flange of base 10 and extends forwardly therefrom. Slidably mounted for vertical movement within the guide structure 23 is a two-piece slide consisting of an upper member 26 and lower member 27, said slide members having overlapping adjacent end portions that are bolted together by bolts 28, 28 as is best shown in Figure 3. The upper slide member is formed with slots for receiving the bolts 28, the arrangement being such as to enable the overall length of the slide to be varied. The upper end of slide member 26 is forked to receive the forward end portion of lever 18, and said forked portion has a roller 29 journaled therein that overlies the end portion of said lever 18. The arrangement is such that vertical reciprocation of the slide operates lever 18 to raise and lower the spindle 17.

In the inoperative position of the apparatus the slide is in elevated position, and for moving the slide to elevated position both spring means and fluid pressure operated means are employed. To this end the bolts 28 that connect the upper and lower slide portions also secure brackets 31, 32 thereto. Bracket 31 projects rearwardly from the slide, and has connected thereto the lower end of a tension spring 33, the upper end of the latter being secured to a suitable screw-eye 34 threaded into the bottom of housing formation 11a. The bracket 32 is connected to the outer end of a piston rod 36 of a vertically disposed, single-acting fluid pressure operated cylinder 37 that is secured to the anchor plate 24 by means of straps 38 and bolts 39, the lower strap 38 comprising the lower head of the cylinder. An inlet and outlet pipe 40 extends from the lower end of the cylinder 37 to a suitable source of supply of pressure fluid, means being provided for admitting fluid to the cylinder and evacuating it therefrom in determinate time relation to the operation of mechanism for lowering the slide, as presently will be explained.

For lowering the slide, against the tension of the spring 33, a volute cam 42 is provided, which cam engages a cam roller 43 swiveled on the lower end of the slide, on the rear face thereof. Said cam is mounted upon a driven shaft 44 of a reduction gear device 45, the latter being connected to the shaft of a motor 46 that is mounted upon the base plate 25. The profile of the cam 42, as is best shown in Figure 2, is such as to impart a slow, steady, and uniform, downward movement to the slide, and consequently a similar rising movement to the spindle 17. The cam may be so shaped that the rising movement of the slide is more rapid, and may terminate in an abrupt stop. A cycle of operation of the apparatus is effected during one complete revolution of the shaft 44 and cam 42, and for stopping the motor after the said shaft has made one revolution, a limit switch is provided, said switch being mounted in a switch box 47 upon a bracket 48, to the right of the reduction gear device 45 as viewed in Figures 2 and 5. The limit switch is provided with an operating lever 49 that projects into the orbit of a cam 50 that is mounted upon shaft 44, behind cam 42. The depressing of lever 49 by cam 50 stops the operation of motor 46. The starting of said motor is effected by means of a suitable push-button switch mounted in a switch box 51 as shown conventionally in Figure 7. The wiring connection of said limit switch and said starting switch presently will be described.

Mounted upon the top of the housing 11 is a large, annular plate 52 that is disposed exactly in a horizontal plane, and which constitutes a seat or rest for the balancing head of the apparatus in the inoperative position thereof. The balancing head proper, which is designated 53, consists of an annular structure having a tubular axial hub 54, a peripheral portion that has an annular plate or work-seat 55 on the top face thereof, and a downwardly extending flange on said peripheral portion, the edge of said flange being rounded as shown at 56. Removably mounted atop of the head 53, concentrically therewith, is an annular adapter 57 upon which a tire to be balanced, such as the tire 58, is mountable in a horizontal plane. The lower margin of the adapter 57 is formed with a peripheral flange 59 upon which the lower bead of the tire 58 rests during a balancing operation, the lower sidewall of the tire resting upon the seat 55. The adapter is formed with a circumferential series of upstanding formations 60, 60, the outwardly presented faces of which have respective removable inserts 61 mounted therein, which inserts engage the inner circumference of a tire mounted upon the adapter to center the tire thereon. The formations 60 support a flat plate or disc 62 upon the top thereof, which plate is marked off in degrees, as shown in Figure 1.

Figure 4:
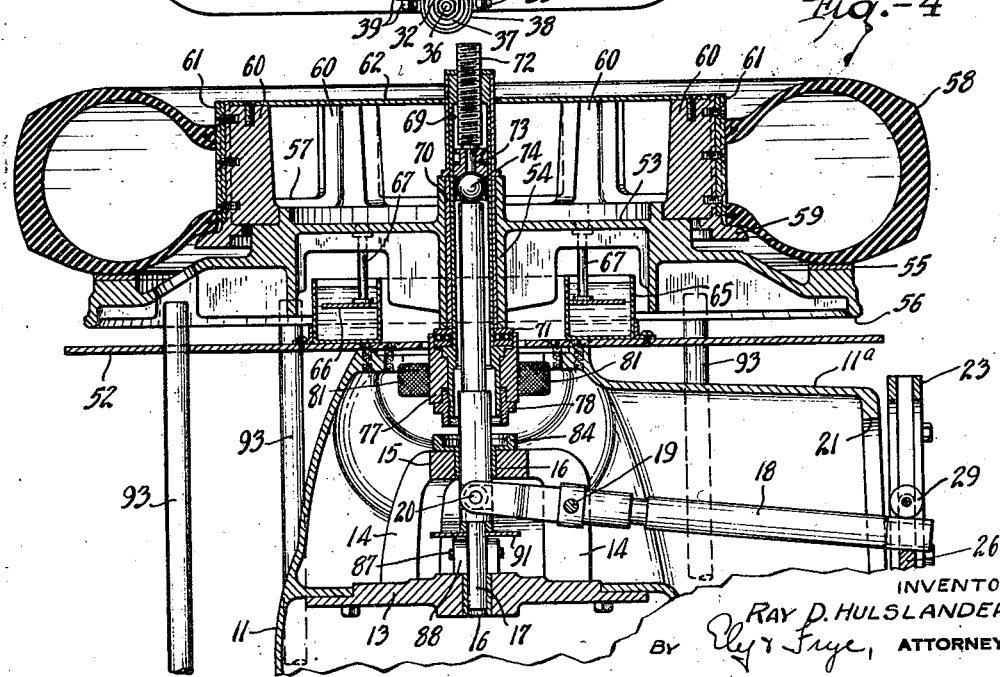
Figure 4 is a section similar to Figure 3 of a portion of the apparatus, and tire thereon, the apparatus being shown in operative, tire balance position.

By means of the vertically movable spindle 17 previously described, the balancing head 57, with tire thereon, may be moved from the lower, inoperative position shown in Figures 2, 3 and 6, to the elevated operative position shown in Figure 4 wherein the rounded flange portion 56 of the head is clear of the supporting plate 52. During the lifting of the balancing head, and after it is lifted, it is desirable that oscillation of the head quickly be suppressed so that an immediate reading of an indicator, presently to be described, may be made. To this end an annular receptacle 65 is mounted upon the supporting plate 52, beneath the balancing head 53 and concentric therewith, said receptacle being substantially filled with a heavy, non-volatile liquid such as castor oil. Suspended in the said liquid is an annular swash plate 66, the margins of which are spaced somewhat from the lateral walls of the receptacle 65. The swash plate 66 is carried by a plurality of studs 67, 67 that project downwardly from the under side of the balancing head 53. The arrangement is such that oscillation of the head in all directions quickly is suppressed.

The connection between the spindle 17 and the balancing head 53 is such as to enable said head to have practically universal movement relatively of said spindle. To this end a sleeve 69 is mounted within the hub 54 of the head 53 and projects from both ends thereof, there being a bushing 70 disposed between the sleeve and the wall of the hub. Near its lower end the sleeve 69 is formed with a circumferential flange upon which rests a ball bearing 71, the bushing 70 and lower end of the hub 54 resting upon said bearing. The upper end of the sleeve 69 is closed, and has a screw 72 threaded therethrough, there being a ball-holder 73 swiveled on the lower end of said screw, said ball-holder having sliding fit within the sleeve. The ball-holder 73 is formed with a downwardly opening socket, and a hardened spherical ball 74 is mounted in said socket with a force fit that normally retains it therein. The screw 72 provides means by which the position of the ball 74 may be adjusted, axially of the sleeve 69, to adapt the apparatus to various conditions. In the inoperative position of the apparatus, when the balancing head rests upon the supporting plate 52, the upper end of the spindle 17, which extends into the sleeve 69 with substantial clearance on all sides therefrom, is out of engagement with the ball 74, as shown in Figure 3. In the operative position of the apparatus, as shown in Figure 4, the ball 74 bears upon the upper end of the spindle 17, and thus supports the balancing head for universal oscillating movement thereon. The ball 74 thus becomes the center of oscillation of the balancing head and work thereon, and this center of oscillation is above the center of gravity of the said parts. By adjusting the position of the ball, this condition may be obtained, notwithstanding changes in the size and weight of tires that may be balanced on the apparatus.

In combination with the balancing head is indicating mechanism for indicating the location of and the extent of the off-balance condition of the tire 58. Said mechanism comprises an elongated arm 76 that is formed with a centrally located, axially apertured hub 77, the latter being mounted upon the lower end portion of the sleeve 69 and retained thereon by a nut 78 that is threaded onto the lower end of said sleeve. The arm 76 is disposed within the arm-like formations 11b of the housing 11, and at one end thereof carries an inclination indicator 79 of the spirit-level type, said indicator having a concavo-convex lens that is circumferentially calibrated into degrees, and radially calibrated by concentric circles to indicate the number of ounces of unbalance existing in the head, the weight of unbalance in ounces being a function of the angular tilt of the head. The opposite end of the arm 76 from that which carries the indicator 79 is provided with adjustable counterweights by means of which the normal balancing of the head may be effected. Of said counterweights, that designated 80 is adjustable toward and from the axis of the head, and those designated 81, 81 are adjustable laterally with relation to the arm 76. The degree calibrations on the indicator 79 are arranged in the same order as the degree calibrations on the plate 62, so that the operator readily may indicate on the tire 58, by a chalk mark or similar device, the exact location of the lightest region of the tire as visibly indicated by the indicator 79. When an inner tube subsequently is mounted in the tire, the valve stem of the tube will be positioned at the indicated region of lightest weight of the tire, to assist in balancing the latter.

Mounted atop of the bearing structure 15 is a cup-like guide member 84 in which the lower end portion of the nut 78 is receivable in the lowered, inoperative position of the balancing head. The member 84 thus assists in guiding the balancing head to proper inoperative position, and retains it in said position during the removal of a tire from said head, and the mounting of another tire thereon. The nut 78 is well clear of the said guide member in the elevated, operative position of the balancing head, as shown in Figure 4, so that the head may tilt if unbalanced.

In order to prevent the balancing head from being lifted or otherwise displaced as tires are being mounted thereon or removed therefrom, suitable hold-down means is provided. Said hold-down means comprises a pair of hooks 86, 86, which hooks have the shape of bell cranks and are pivotally mounted at 87, 87 at their respective elbows, in suitable upstanding lugs 88 formed on the top side of bracket 13, on diametrically opposite sides of the spindle 17 that passes therethrough. The long arms of the hooks 86 extend upwardly, their free ends being turned toward each other and adapted to engage respective laterally projecting formations 89 on opposite sides of the nut 78. The short arms of the hooks extend toward each other, and normally are urged upwardly by respective compression springs 90 that are disposed beneath them in suitable recesses in the top of bracket 13. The springs 90 normally urge the hooked free ends of the members 86 away from the formations 89 of the nut 78, thus enabling the balancing head to be elevated to operative position. Mounted upon the spindle 17, near the lower end thereof, is a metal disc 91 that is disposed above the free ends of the short arms of the hooks 86, and engages them as the spindle is moved downwardly to lower the balancing head to inoperative position, with the result that the hooks 86 are moved angularly against the pressure of the springs 90, and engage the formations 89 on the nut 78, as shown in Figure 6. The arrangement prevents lifting of the balancing head except by upward movement of the spindle 17.

The apparatus also includes means for lifting a tire substantially off the balancing head at the conclusion of an operative cycle as a means for expediting operations. Said means comprises a plurality of axially movable, vertically arranged push rods 93, 93, herein shown as five in number, adapted to engage the lower side wall of a tire. Said push rods also constitute a support for the tire when the latter initially is placed upon the balancing head, and they are adapted to lower the tire into fully seated position upon the balancing head before the latter is lifted off its supporting plate 52, at the beginning of a balancing operation.

The push rods 93 are supported from their lower ends upon an annular frame 95 that encircles the base casting 10, below housing 11, and are guided by apertured brackets 96, 96 that are mounted upon the top of said base casting, below said housing, the push rods extending through the apertures of said brackets. The balancing head structure 53 also is formed with a circumferential series of apertures 97 through which the upper end portions of the push rods freely extend.

Raising and lowering of the annular frame 95 exerts a similar effect upon the push rods, and for raising and lowering said frame, angular brackets 99, 99 are secured thereto at diametrically opposite sides thereof. Each bracket 99 has a link 100 pivotally connected thereto at one of its ends, said link 100 being one element of a toggle of which link 101 is the other element thereof. One end of each link 101 is pivotally connected to a fixed point 102 on the base casting 10, near the bottom thereof, and link 100 is pivotally connected to link 101 near the other end thereof. The last mentioned end of link 101 is pivotally connected to one end of a link 103, the other end of the latter being pivotally connected to a cross head 104. The cross head 104 is horizontally disposed, and is slidably mounted for lateral reciprocatory movement upon a pair of horizontal guide bars 105, 105 that are supported from one end in the base casting 10 and project laterally therefrom. The arrangement is such that lateral movement of the cross head 104 operates both toggles so as to raise or lower the rod-supporting frame 95. Compression springs 106, 106 are mounted upon opposite end portions of both bars 105 so as to cushion the cross head at each end of its course of movement.

Reciprocation of the cross head 104 is effected by means of a double-acting fluid pressure operated cylinder 108, Figures 3, 5 and 7, that is mounted within the base casting 10 and has a piston rod 109 that extends exteriorly of said casting and is connected at its outer end to the cross head 104, at the middle of the latter, said piston rod being parallel to guide bars 105. Operation of the cylinder 108 is effected by means of a remote control valve 110 of well known balanced piston type, which valve is connected to a source of fluid pressure (not shown) by means of pipe 111. A pipe 112 is provided for conducting pressure fluid from one end of valve 110 to the rear end of cylinder 108, and a pipe 113 conducts pressure fluid from the other end of valve 110 to the front end of cylinder 108. The pipe 40 from cylinder 37 has connection with said pipe 113 to the end that cylinders 37 and 108 operate in determinate time relation to each other. For operating the valve 110, two solenoid-operated pilot valves are provided, one of which valves is designated 115 and serves to move valve 110 so that the latter admits fluid to the rear of cylinder 108 through pipe 112, the other pilot valve being designated 116 and adapted to move valve 110 so as to discharge fluid from the rear of cylinder 108 and to admit fluid to the front end thereof through pipe 113.

The circuit diagram of the several electrical instrumentalities mentioned is shown in Figure 7. In addition to the instrumentalities mentioned, the circuit also includes a starting coil or relay 118 that is mounted in a suitable receptacle 119 upon the pedestal 10. The relay 118 is arranged to actuate two contact arms 120, 121 respectively. Power for operating the apparatus is provided by the power lines designated $L_1$ and $L_2$. Line $L_2$ connects with one side of relay coil 118, the other side thereof being connected by conductor 122 to contact arm 120, and being connected by conductor 123 to line $L_1$, a normally open starter switch 124 being mounted across said conductor 123. Starter switch 124 is mounted in switch box 51 aforementioned. When the relay 118 is deenergized, contactor arms 120, 121 are open. When the relay is energized, contactor arm 120 closes and makes contact with a conductor 125 that extends therefrom to line $L_1$, there being two normally closed switches 126, 127 mounted in series across said conductor 125. Switch 126 is a stop switch of the push button type, and is located in the switch box 51. Switch 127 is the limit switch mounted in the switch box 47 and adapted to be opened by the operation of cam 50 upon lever arm 49. When contactor arm 121 closes upon energization of relay 118, it makes contact with a conductor 128 extending to line $L_1$. The pilot valve 115 is operated through the agency of electrical conductors 130, 131 of which conductor 130 connects with contactor 121 and conductor 131 connects with line $L_2$. Motor 46 also is operatively connected to conductors 130, 131. The pilot valve 116 is operated through the agency of conductors 133, 134 of which conductor 133 connects to line $L_2$ through conductor 131, and conductor 134 connects with line $L_1$. A normally open operating switch 135 is mounted across conductor 134, said switch being located in the switch box 47, and being closed at the same time and by the same means as that which opens the limit switch 127.

In the operation of the apparatus, assuming the same to be in the inoperative position shown in Figures 2, 3 and 6, the first task of the operator is to mount a tire 58, the same being placed so as to rest upon the upper ends of the rods 93, which are in raised position. The operator then momentarily presses the operating button of starter switch 124, with the result that relay 118 is energized, the motor 46 is set in motion, and pilot valve 115 actuated so as to cause valve 110 to deliver fluid pressure to the rear end of cylinder 108. Outward movement of piston 109 of the latter operates the toggles that support frame 95, in a manner to lower said frame and the rods 93 supported thereby, and thus to lower the tire 58 onto the seat 55 of the balancing head 53. The driving of motor 46 turns the cam 42 clockwise, as indicated by the arrow in Figure 2, thereby depressing the slide members 26, 27 against the force of spring 33, with the result that lever 18 is caused to elevate spindle 17 and with it the balancing head 53 and tire 58 thereon. As the balancing head rises from supporting plate 52, it will tilt downwardly at the point where it is heaviest, due to any unbalance of the tire 58, but such tilting will be smooth and uniformly effected by reason of the rounded margin 56 on the balancing head. Although the cam 42 effects a quick rise of the balancing head, the latter does not oscillate, but quickly assumes an angular position in definite relation to the extent of off balance of the tire, the suppression of oscillation being effected by the swash plate 66 in the body of liquid in receptacle 65. Thus it is possible to take a reading of the indicator 79 as soon as the balancing head is fully elevated, the bubble in the indicator showing the location of the lightest part of the tire, and the extent of lightness. The operator then applies a suitable mark to the tire to indicate its lightest region, using the calibrated disc 62 as an aid in properly placing the mark.

The cam 42 is so shaped that the balancing head 53 quickly is lowered to inoperative position immediately after it has reached its highest elevated position. As its spindle 17 reaches lowermost position it operates the hooks 86 so that the latter engage the formations 89 on the nut 78 and thereby prevent the lifting of the balancing head while the tire is being removed therefrom. Substantially concurrently with the lowering of the balancing head, the cam 50 engages and swings operating lever 49 of limit switch 127, thus opening the latter and closing switch 135. Opening of switch 127 de-energizes relay 118, and opens the power conductors to motor 46 and pilot valve 115, thus stopping the motor and de-energizing said pilot valve. Closing of switch 135 energizes pilot valve 116 which so moves valve 110 as to charge the front end of cylinder 108 while discharging the rear end thereof so that its piston rod 109 is moved inwardly into the cylinder. This operates the toggles of the frame 95 so as to raise the latter, with the result that the rods 93 thereon lift the tire 58 from the position shown in broken lines in Figure 3 to the position shown in full lines therein, so that complete removal of the tire readily is accomplished. The cylinder 37 is charged concurrently with the charging of the front end of cylinder 108, and assists the spring 33 in raising the slide 26, 27 to lower the spindle 17, and thereafter assists in maintaining the said parts in the position desired.

This completes a cycle of operation of the apparatus, and is repeated as fast as the operator can remove the tire 58 and replace it with another. The cam 50, before coming to a complete stop, releases lever 49 so that it moves back to normal position, thus closing switch 127 and opening switch 135. This de-energizes pilot valve 116, but has no effect upon valve 110.

The invention saves time and labor in the balancing of tires, it makes possible greatly accelerated operation, and achieves the other advantages set out in the foregoing statement of objects.

Modification may be resorted to without departing from the spirit of the invention, or the scope thereof as defined by the appended claims.

What is claimed is:

1. In tire balancing apparatus, the combination of an annular balancing head disposed on a vertical axis for supporting a tire, said balancing head being formed at the bottom thereof with a peripheral flange having a rounded seating surface, a supporting plate below said head upon which the head may seat when in inoperative position, means mounting the head for universal tiltable movement about a point in its axis when in elevated position, means associated with the head for suppressing oscillation thereof, power operated means for raising and lowering the balancing head, and power operated means moving upwardly through apertures in the said flange and supporting plate in timed relation to the raising and lowering of the head for raising and lowering a tire relatively of the head.

2. In tire balancing apparatus, the combination of an annular balancing head capable of universal tilting movement about a point of oscillation, an annular swash plate attached to said head concentric with said axis of oscillation, and a body of heavy liquid in which said swash plate is immersed.

3. In tire balancing apparatus, the combination of a balancing head for supporting a tire, a support for said head, power operated means for raising and lowering said head relatively of said support, and means moving upwardly through said head and its support in determinate time relation to the raising and lowering of the head for raising and lowering a tire relatively of the head.

4. In tire balancing apparatus, the combination of a balancing head for a tire, a support for said head, motor driven means for raising and lowering said head relatively of said support, fluid pressure operated means for raising and lowering a tire relatively of said head, and means operated by said motor controlling the operation of the fluid pressure means at determinate time intervals with relation to the raising and lowering of the balancing head.

5. In tire balancing apparatus, the combination of a balancing head for a tire, a support for said head, a vertically movable spindle for raising and lowering said head relatively of said support, a lever operatively connected to said spindle for axially moving the same, a slide engaging said lever, a cam operating said slide, a motor driving said cam, push rods extending through said balancing head for raising and lowering a tire relatively thereof, fluid pressure means for operating said push rods, fluid pressure means adapted to urge the slide in the direction that depresses the spindle, and electrical means under the control of the motor for operating both of said fluid pressure means at determinate time intervals.

6. In tire balancing apparatus, the combination of a balancing head for supporting a tire, a stationary support for said head, a reciprocable axial spindle adapted pivotally to support the head on its upper end, means disposed below the tire adapted to elevate the tire relatively of the head, and means for reciprocating said spindle to raise and lower the head relatively of its stationary support, and means operating in determinate time relation thereto for vertically reciprocating the tire elevating means.

7. In a tire balancing apparatus, the combination of a balancing head for supporting a tire, means for raising and lowering said head, a support for the head in the lowered position thereof, means disposed below the tire and movable upwardly relatively of the head to lift the tire off the latter when the head is in lowered position, and means preventing lifting of the head as the result of rising movement of the tire thereon.

RAY D. HULSLANDER.